(12) United States Patent
Rambo

(10) Patent No.: US 11,512,639 B2
(45) Date of Patent: Nov. 29, 2022

(54) HEAT TRANSFER SYSTEM

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/158,289

(22) Filed: Jan. 26, 2021

(65) Prior Publication Data
US 2022/0235705 A1 Jul. 28, 2022

(51) Int. Cl.
*F02C 7/16* (2006.01)
(52) U.S. Cl.
CPC .......... *F02C 7/16* (2013.01); *F05D 2260/205* (2013.01); *F05D 2260/213* (2013.01); *F05D 2260/232* (2013.01); *F05D 2260/601* (2013.01); *F05D 2270/101* (2013.01)
(58) Field of Classification Search
CPC ...... F02C 7/12; F02C 7/16; F02C 7/18; F02C 7/185
See application file for complete search history.

(56) References Cited

U.S. PATENT DOCUMENTS

| | | | | |
|---|---|---|---|---|
| 4,254,618 A | * | 3/1981 | Elovic | F02C 7/185 60/39.83 |
| 5,392,614 A | * | 2/1995 | Coffinberry | F02C 7/18 60/806 |
| 5,438,823 A | * | 8/1995 | Loxley | F02C 7/14 165/41 |
| 5,729,969 A | * | 3/1998 | Porte | F02C 7/185 60/782 |
| 6,282,881 B1 | * | 9/2001 | Beutin | F02C 7/14 60/226.3 |
| 6,651,929 B2 | * | 11/2003 | Dionne | B64D 41/00 165/44 |
| 7,033,135 B2 | * | 4/2006 | Mortzheim | F02C 7/1435 415/115 |
| 7,104,750 B2 | * | 9/2006 | Bolis | F02C 3/30 415/117 |
| 7,175,692 B2 | | 2/2007 | Schwalm | |
| 7,445,659 B2 | | 11/2008 | Schwalm | |

(Continued)

FOREIGN PATENT DOCUMENTS

EP 3287849 A1 * 2/2018 ............. G03G 15/08

*Primary Examiner* — Craig Kim
(74) *Attorney, Agent, or Firm* — Dority & Manning, P.A.

(57) ABSTRACT

A heat transfer system includes a heat exchanger located at least partially within a coolant flowpath. The heat exchanger defines at least in part a first flowpath and a second flowpath, the first flowpath configured to be in fluid communication with the coolant flowpath, and the second flowpath configured to receive a flow of a motive fluid. The heat transfer system further includes a throttling device that is in fluid communication with the second flowpath of the heat exchanger. The heat exchanger receives at least a portion of the flow of the motive fluid from the heat exchanger. The throttling device is also in fluid communication with the coolant flowpath at a location upstream of the heat exchanger for providing the flow of motive fluid to the coolant flowpath at the location upstream of the heat exchanger.

20 Claims, 3 Drawing Sheets

(56) References Cited

U.S. PATENT DOCUMENTS

| | | | | |
|---|---|---|---|---|
| 7,765,788 B2* | 8/2010 | Schwarz | F02C 7/14 | |
| | | | 60/39.08 | |
| 7,810,312 B2* | 10/2010 | Stretton | F02K 3/06 | |
| | | | 60/785 | |
| 7,861,513 B2* | 1/2011 | Stretton | F02K 3/115 | |
| | | | 60/728 | |
| 8,418,471 B2* | 4/2013 | Baltas | F02K 3/06 | |
| | | | 60/226.3 | |
| 8,690,098 B2 | 4/2014 | Todorovic | | |
| 8,756,910 B2* | 6/2014 | Donovan | F02C 7/143 | |
| | | | 415/176 | |
| 8,784,047 B2* | 7/2014 | Elder | F04D 29/584 | |
| | | | 415/178 | |
| 8,904,753 B2* | 12/2014 | Murphy | F02C 7/185 | |
| | | | 165/96 | |
| 8,910,465 B2* | 12/2014 | Snyder | F02K 3/115 | |
| | | | 60/785 | |
| 8,967,958 B2* | 3/2015 | Bajusz | F02C 7/14 | |
| | | | 415/178 | |
| 9,045,998 B2* | 6/2015 | Lo | F02C 6/08 | |
| 9,145,774 B2* | 9/2015 | Fuchs | F02C 7/185 | |
| 9,212,623 B2* | 12/2015 | Murphy | F01D 25/145 | |
| 9,234,481 B2* | 1/2016 | Suciu | F02C 7/224 | |
| 9,267,434 B2* | 2/2016 | Campbell | F02K 3/115 | |
| 9,458,764 B2 | 10/2016 | Alecu et al. | | |
| 9,624,831 B2* | 4/2017 | Brousseau | F01D 25/02 | |
| 9,885,313 B2* | 2/2018 | Baltas | F02K 1/15 | |
| 10,036,329 B2* | 7/2018 | Suciu | F01D 17/105 | |
| 10,066,550 B2* | 9/2018 | Riehle | F02K 3/115 | |
| 10,203,159 B2 | 2/2019 | Zager et al. | | |
| 10,436,115 B2* | 10/2019 | Duesler | F02C 7/18 | |
| 10,634,051 B2* | 4/2020 | Schwarz | F01D 21/02 | |
| 10,641,174 B2* | 5/2020 | Mukhopadhyay | F01D 5/085 | |
| 10,794,288 B2* | 10/2020 | Schwarz | F02K 3/075 | |
| 10,830,543 B2* | 11/2020 | Schmitz | F28F 9/0265 | |
| 11,028,775 B2* | 6/2021 | Mackin | F02C 7/18 | |
| 11,060,484 B2* | 7/2021 | Silkey | B64D 33/08 | |
| 11,078,837 B2* | 8/2021 | Zysman | F02C 7/06 | |
| 11,261,792 B2* | 3/2022 | Niergarth | F02C 7/16 | |
| 2008/0053060 A1* | 3/2008 | Olver | F02C 7/14 | |
| | | | 60/226.1 | |
| 2008/0230651 A1* | 9/2008 | Porte | F01D 9/065 | |
| | | | 60/785 | |
| 2013/0036747 A1* | 2/2013 | Fuchs | F01D 5/187 | |
| | | | 60/782 | |
| 2014/0144139 A1* | 5/2014 | Alecu | F02C 7/185 | |
| | | | 29/890.03 | |
| 2016/0231068 A1* | 8/2016 | Schmitz | F28F 9/0265 | |
| 2017/0002741 A1* | 1/2017 | Alecu | F02C 7/14 | |
| 2017/0335769 A1 | 11/2017 | Boujida et al. | | |
| 2019/0063324 A1 | 2/2019 | Gould et al. | | |
| 2019/0283887 A1 | 9/2019 | Ernst et al. | | |
| 2020/0271073 A1* | 8/2020 | Banham | F02C 7/18 | |
| 2022/0063826 A1* | 3/2022 | Hiett | B64D 27/10 | |

* cited by examiner

HEAT TRANSFER SYSTEM

FIELD

The present disclosure relates to a heat transfer system, such as a heat transfer system for a gas turbine engine.

BACKGROUND

Typical aircraft propulsion systems include one or more gas turbine engines. Gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain systems of gas turbine engines and aircraft may generate a relatively large amount of heat and require cooling. For example, a turbine section or an auxiliary system, such as a lubrication system, may require cooling. A heat transfer system can be provided to cool these systems. The inventors of the present disclosure have come up with various configurations to improve on the currently known heat transfer systems.

BRIEF DESCRIPTION

Aspects and advantages of the invention will be set forth in part in the following description, or may be obvious from the description, or may be learned through practice of the invention.

In one exemplary embodiment of the present disclosure, a heat transfer system is provided. The heat transfer system includes a heat exchanger located at least partially within a coolant flowpath. The heat exchanger defines at least in part a first flowpath and a second flowpath, the first flowpath configured to be in fluid communication with the coolant flowpath, and the second flowpath configured to receive a flow of a motive fluid. The heat transfer system further includes a throttling device that is in fluid communication with the second flowpath of the heat exchanger. The heat exchanger receives at least a portion of the flow of the motive fluid from the heat exchanger. The throttling device is also in fluid communication with the coolant flowpath at a location upstream of the heat exchanger for providing the flow of motive fluid to the coolant flowpath at the location upstream of the heat exchanger.

In another exemplary embodiment of the present disclosure, a gas turbine engine is provided. The gas turbine engine includes a turbomachine having a compressor section, a combustion section, and a turbine section. The gas turbine engine further includes a cooling airflow passage and a heat transfer system that is positioned to receive a coolant fluid from the compressor section, the cooling airflow passage, or both. The heat transfer system includes a heat exchanger located at least partially within a coolant flowpath. The heat exchanger defines at least in part a first flowpath and a second flowpath, the first flowpath configured to be in fluid communication with the coolant flowpath, and the second flowpath configured to receive a flow of a motive fluid. The heat transfer system further includes a throttling device that is in fluid communication with the second flowpath of the heat exchanger. The heat exchanger receives at least a portion of the flow of the motive fluid from the heat exchanger. The throttling device is also in fluid communication with the coolant flowpath at a location upstream of the heat exchanger for providing the flow of motive fluid to the coolant flowpath at the location upstream of the heat exchanger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
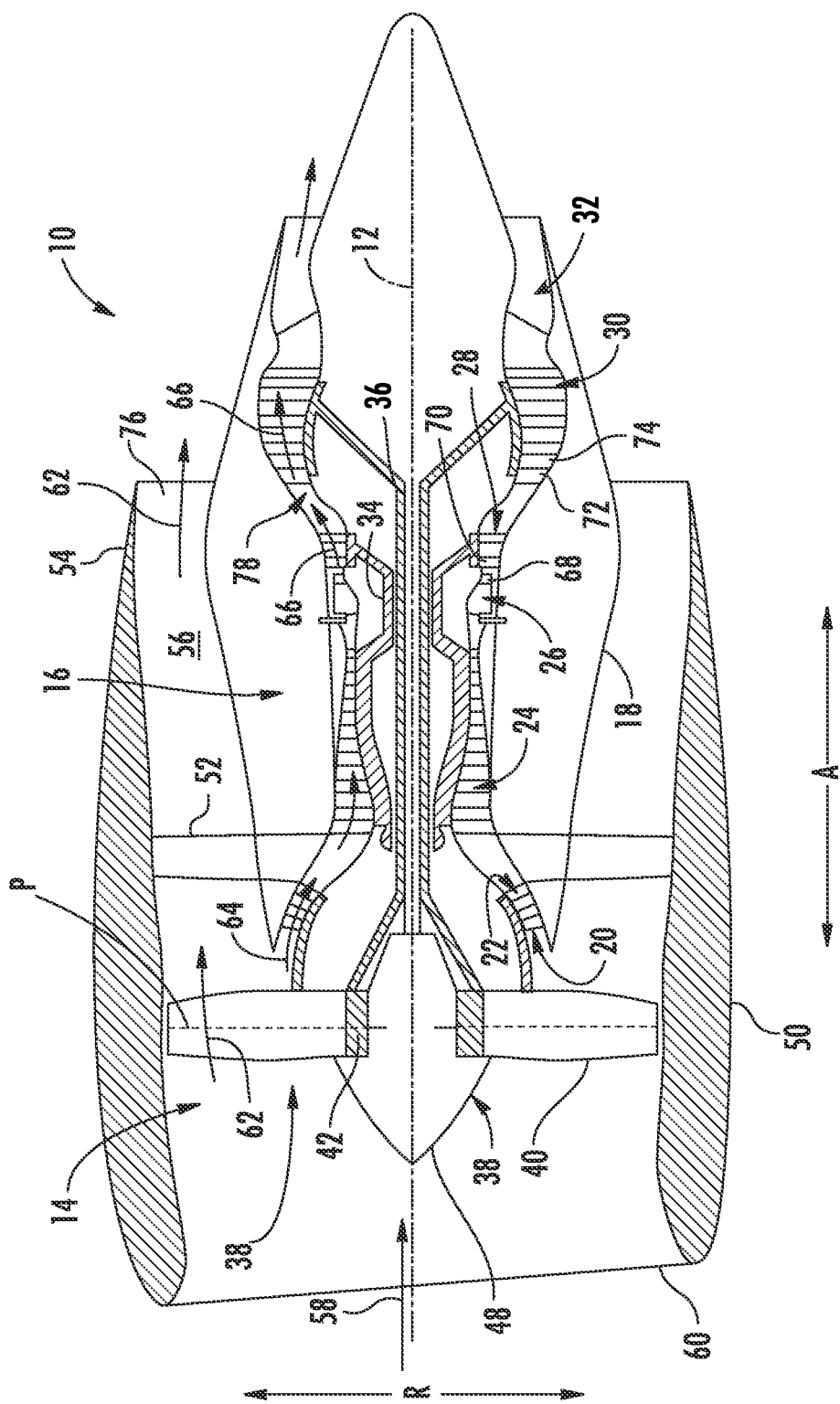
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "fluid" may be a gas or a liquid. The term "fluid communication" means that a fluid is capable of making the connection between the areas specified.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a gas turbine engine can be equipped with one or more heat transfer systems. The heat transfer systems can be provided to cool certain systems of the gas turbine engine or of the aircraft that the gas turbine engine is installed upon. For example, the heat transfer system can be provided to cool a turbine section or an auxiliary system, such as a lubrication system. The heat transfer system can cool these systems by cooling a fluid, such as air or a lubricant, that is delivered to these systems.

For example, in at least one embodiment, a heat transfer system may include a heat exchanger located at least partially within a coolant flowpath, the heat exchanger defining at least in part a first flowpath 213 and a second flowpath. The coolant flowpath may be, e.g., an airflow path configured to receive ambient air or bypass air from a bypass passage to provide a flow of relatively cool air through the first flowpath 213 of the heat exchanger. The second flowpath of the heat exchanger may be configured to receive a flow configured to be cooled, which as will be appreciated from the discussion herein, may be referred to as a motive fluid.

The heat transfer system may further include a throttling device in fluid communication with the second flowpath of the heat exchanger for receiving at least a portion of the flow of the motive fluid from the heat exchanger. The throttling device may be further in fluid communication with the coolant flowpath at a location upstream of the heat exchanger for providing the flow of motive fluid to the coolant flowpath at the location upstream of the heat exchanger. In such a manner, the motive fluid may generate additional airflow through the coolant flowpath to increase an amount of cooling the heat exchanger may achieve. Further, as the throttling device is located upstream of the heat exchanger, the relatively cool motive fluid provided to the coolant flowpath may further increase an amount of cooling the heat exchanger may achieve.

A valve may be provided to control the amount of fluid provided to the throttling device and an amount of the fluid used as a cooling fluid within the gas turbine engine. Additionally, or alternatively, the heat exchanger may define a third flowpath to cool air for use within the gas turbine engine, or to cool lubricant flowing through a lubrication system.

Systems are described herein that extend beyond the claimed heat transfer system. It will be appreciated that these systems are provided by way of example only, and the claimed systems are not limited to applications using or otherwise incorporated with these other systems. The disclosure is not intended to be limiting. For example, it should be understood that one or more embodiments described herein may be configured to operate independently or in combination with other embodiments described herein.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38 having a plurality of fan blades 40 coupled to a rotor disk 42 in a spaced apart manner. As depicted, the fan blades 40 extend outwardly from rotor disk 42 generally along the radial direction R. The disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. It should be appreciated that the nacelle 50 may be configured to be supported relative to the core 16 by a plurality of circumferentially-spaced outlet guide vanes 52. Moreover, a downstream section 54 of the nacelle 50 may extend over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan 38 nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured as a variable pitch fan including, e.g., a suitable actuation assembly for rotating the plurality of fan blades about respective pitch axes, the turbofan engine 10 may be configured as a geared turbofan engine having a reduction gearbox between the LP shaft 36 and fan section 14, etc. It should also be appreciated, that in still other exemplary embodiments, aspects of the present disclosure may be incorporated into any other suitable gas turbine engine. For example, in other exemplary embodiments, aspects of the present disclosure may be incorporated into, e.g., turboprop engine.

Figure 2:
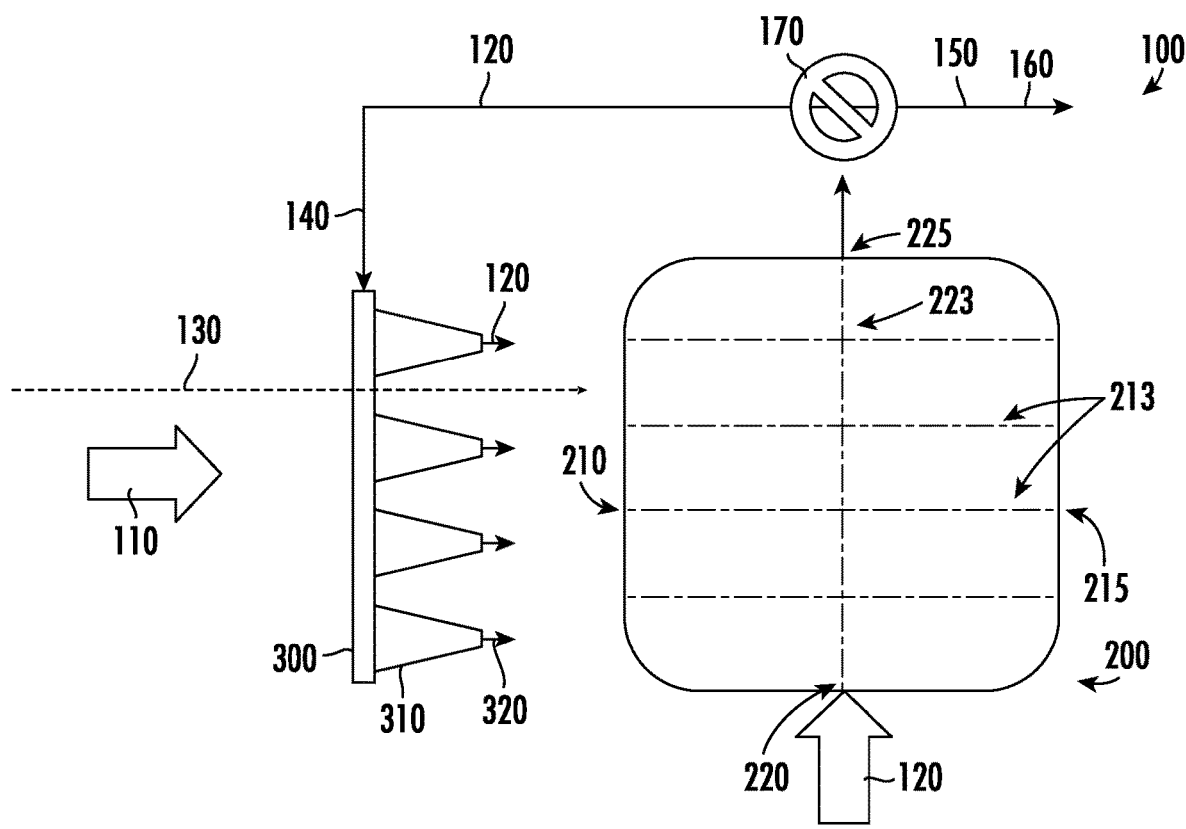
FIG. 2 is a schematic view of a heat transfer system in accordance with an exemplary embodiment of the present disclosure.

Referring now also to FIG. 2, a schematic view of a heat transfer system 100 in accordance with an exemplary embodiment of the present disclosure is shown. The heat transfer system 100 includes a heat exchanger 200 and a throttling device 300. The heat transfer system 100 can be configured to receive a pressurized motive fluid 120, cool it through a heat exchanger 200, and then in certain exemplary embodiments expand it down to a lower pressure to cool it further.

The heat exchanger 200 can be located at least partially within a coolant flowpath 130. For example, the heat exchanger 200 can be located at least partially in a duct, such as bypass airflow passage 56, or a scoop, such as scoop 400 (FIG. 4), of a gas turbine engine. Alternatively, the heat exchanger 200 can be located at least partially within, or otherwise in airflow communication with, any other suitable coolant flowpath 130, such as a RAM air flowpath, an ambient air flowpath, a bleed air flowpath (e.g., from a forward stage of a compressor section), etc.

The heat exchanger 200 defines at least in part a first flowpath 213 having an inlet 210 and an outlet 215, and a second flowpath 223 having an inlet 220 and an outlet 225. The first flowpath 213 is configured to be in fluid communication with a coolant fluid 110 flowing through the coolant flowpath 130, and the second flowpath 223 is configured to be in fluid communication with a motive fluid 120. The inlet 210 of the first flowpath 213 is configured to receive the flow of the coolant fluid and the inlet 220 can be configured to receive the flow of the motive fluid 120.

The motive fluid 120 received by the inlet 220 can be a higher pressure than the coolant fluid 110 that is received by the inlet 210. For example, the pressure of the motive fluid 120 received by the inlet 220 can be at least two times higher than the pressure of the coolant fluid 110 that is received by the inlet 210, as measured in pounds per square inch absolute (PSIA). For example, the pressure of the motive fluid 120 received by the inlet 220 can be at least four times higher, such as at least six times higher, such as at least eight times higher than the pressure of the coolant fluid 110 that is received by the inlet 210, and up to about 20 times higher, such as up to about 18 times higher, such as up to about 16 times higher, such as up to about 14 times higher than the pressure of the coolant fluid 110 that is received by the inlet 210.

By way of example only, in one example embodiment, the pressure of the motive fluid 120 is approximately 500 PSIA, whereas the pressure of the coolant fluid is approximately 50 PSIA. In another example, the pressure of the motive fluid 120 received by the inlet 220 can be approximately four to six times higher than the pressure of the coolant fluid 110 that is received by the inlet 210, as measured in PSIA. In one example, the pressure of the motive fluid 120 is approximately 375 PSIA, whereas the pressure of the coolant fluid is approximately 75 PSIA.

The motive fluid 120 received by the inlet 220 can be a higher temperature than the coolant fluid 110 that is received by the inlet 210. For example, the temperature of the motive fluid 120 received by the inlet 220 can be at least two times higher than the temperature of the coolant fluid 110 that is received by the inlet 210, as measure in degrees Fahrenheit (° F.). For example, the temperature of the motive fluid 120 received by the inlet 220 can be at least four times higher, such as at least six times higher, such as at least eight times higher than the temperature of the coolant fluid 110 that is received by the inlet 210, and up to about 20 times higher, such as up to about 18 times higher, such as up to about 16 times higher, such as up to about 14 times higher than the temperature of the coolant fluid 110 that is received by the inlet 210.

By way of example only, in one example embodiment, the temperature of the motive fluid 120 is approximately 1,000° F., whereas the temperature of the coolant fluid is approximately 270° F. In another example, the temperature of the motive fluid 120 received by the inlet 220 can be approximately five to six times higher than the temperature of the coolant fluid 110 that is received by the inlet 210. In one example, the temperature of the motive fluid 120 is approximately 1,100° F., whereas the temperature of the coolant fluid is approximately 200° F.

The flow of motive fluid 120 can be supplied from a bleed line that extracts relatively high pressure gas, such as air, from a compressor section, such as a high pressure compressor section or a low pressure compressor section, or a fan section of the gas turbine engine. Motive fluid 120 may also be provided from a pump or a compressor, such as a pump or compressor used in an auxiliary system for a gas turbine engine. Additionally, motive fluid 120 may be provided from an auxiliary power unit that is on an aircraft. For example, the motive fluid 120 may be extracted from a compressor stage of such an auxiliary power unit.

The heat exchanger 200 can function to cool the motive fluid 120 that passes through it with the coolant fluid 110 that is drawn from the coolant flowpath 130. This is accomplished by arranging the first flowpath 213 to be in thermal communication with the second flowpath 223. For example, the first flowpath 213 and the second flowpath 223 are arranged so that heat is transferred from the second flowpath 223 to the first flowpath 213.

The first flowpath 213 and the second flowpath 223 of the heat exchanger 200 are fluidly independent. In other words, the first flowpath 213 is not in fluid communication with the second flowpath 223. As such, the motive fluid 120 and the coolant fluid 110 do not fluidly mix while traversing through the heat exchanger 200.

As will be appreciated from the discussion herein, the heat exchanger 200 may have any suitably configuration for transferring heat from the second flowpath 223 to the first flowpath 213. For example, in some configurations the heat exchanger 200 can be installed within the gas turbine engine such that one side of the heat exchanger 200 is in contact with the coolant flowpath 130, and the other side of the heat exchanger 200 is in contact with an engine structure, such as an inner wall of a fan casing or a duct scoop. To improve heat transfer between the motive fluid 120 and the coolant air, the heat exchanger 200 may include fins extending into the coolant flowpath 130.

Additionally, or alternatively, the heat exchanger 200 can include baffles and a plurality of tubes extending through the baffles. The tubes can define the first flowpath 213 through the heat exchanger 200 and the area between the baffles can define the second flowpath 223 through the heat exchanger 200. The tubes can be positioned to receive the coolant fluid 110 from the coolant flowpath 130 to cool the motive fluid 120 that is passing in crossflow over the exterior of the tubes and in between the baffles. For example, the heat exchanger 200 can be the same as, or similar to, the heat exchanger 10 of U.S. Pat. No. 9,835,380, which is hereby incorporated by reference.

In the exemplary embodiment shown in FIG. 2, the heat exchanger 200 is configured as a single-pass heat exchanger 200 so that the motive fluid 120 goes into one end of the heat exchanger 200 and exits through the other end of the heat exchanger 200.

However, in other exemplary embodiments, the heat exchanger 200 may alternatively have any other suitable configuration. For example, in another example, the heat exchanger 200 may be configured as a two-pass heat exchanger so that the motive fluid 120 goes into one end of the heat exchanger 200 and is guided through a u-shaped pathway so that it exits on the same side of the heat exchanger 200 as it entered. It should be understood that still other configurations for the heat exchanger 200 are also contemplated. For example, the heat exchanger 200 can be a three-pass, four-pass, five-pass, etc. heat exchanger 200 such that the second flowpath 223 through the heat exchanger 200 is a serpentine-shaped pathway. In yet another example, the heat exchanger 200 can be configured as a plate-fin heat exchanger 200.

The throttling device 300 is in fluid communication with the second flowpath 223 of the heat exchanger 200 and receives at least a portion of the flow of the motive fluid 120 from the heat exchanger 200. For example, in the embodiment shown, a supply line 140 is provided to allow the motive fluid 120 to flow from the outlet 225 of the second flowpath 223 of the heat exchanger 200 to the throttling device 300.

Referring still to FIG. 2, the heat transfer system 100 further includes a valve 170. The valve 170 is more specifically configured as a three-way valve in the embodiment shown. However, the valve 170 may alternatively be configured in any other suitable manner.

The valve 170 is positioned downstream from the outlet 225 of the second flowpath 223 and is configured to adjust the amount of motive fluid 120 to be delivered to the throttling device 300. In this example, a portion of the flow of the motive fluid 120 can be delivered to the throttling device 300, the other portion of the flow of the motive fluid 120 can be discharged from the heat transfer system 100 as a cooling fluid flow. For example, the discharged motive fluid 160 can be provided to another location of the gas turbine engine to cool one or more other portions of the gas turbine engine. The discharged motive fluid 160 can be provided to another location of the gas turbine engine through a discharge line 150.

The discharged motive fluid 160 can be provided to a turbine section, such as a low pressure turbine section or a high pressure turbine section, of the gas turbine engine to cool turbine components. In another example, the discharged motive fluid 160 is provided to auxiliary systems such as lubrication systems.

In such a manner, it will be appreciated that although the airflow being cooled by the heat exchanger 210 is referred to herein as a "motive fluid," the airflow may also be provided from the heat transfer system 100 to the gas turbine engine to provide cooling for the gas turbine engine.

The valve 170 can open, either partially or fully, to allow a variable amount of the flow of the motive fluid 120 to be provided to the throttling device 300. For example, the valve 170 can allow none of the motive fluid 120 or all of the motive fluid 120 to be provided to the throttling device 300, and/or the valve 170 can allow a portion of the motive fluid 120 to be provided to the throttling device 300. In at least one example, the valve 170 allows 10 percent to 90 percent of the flow of the motive fluid 120 to be provided to the throttling device 300 and the remaining amount of the motive fluid 120 to be discharged from the heat transfer system 100. For example, the valve 170 can allow at least 10 percent, such as at least 20 percent, such as at least 40 percent of the flow of motive fluid to be provided to the throttling device 300, and up to about 70 percent, such as about 60 percent, such as about 50 percent, such as about 40 percent of the flow of motive fluid to be provided to the throttling device 300; the remaining amount of the motive fluid 120 is discharged from the heat transfer system 100.

The amount of the motive fluid 120 to be provided to the throttling device 300 can be varied during operation of the gas turbine engine and may be determined based on an engine or aircraft parameter. For example, the amount of motive fluid 120 to be provided to the throttling device 300 can be determined based on the desired temperature of the motive fluid 120 to be provided to another location of the gas turbine engine. When it is determined that the temperature of the motive fluid 120 to be provided to another location of the gas turbine engine needs to be reduced, the valve 170 can open more to allow more of the motive fluid 120 to be provided to the throttling device 300, which may make the heat exchanger 200 more effective, as will be described more fully below. The amount of motive fluid 120 to be provided to the throttling device 300 can be determined based on the temperature difference between the motive fluid exiting outlet 225 of the heat exchanger 200 and the motive fluid exiting the throttling device 300. For example, when the temperature difference is approximately 50° F., such as between 40° F. and up to 60° F., such as between 30° F. and up to 70° F., the amount of motive fluid 120 to be provided to the throttling device 300 can be increased, such as from about zero percent, such as from about 10 percent, such as from about 20 percent, to about 30 percent, to about 40 percent, to about 50 percent of the motive fluid 120 can be provided to the throttling device 300.

In at least one example, the valve 170 is provided to allow a motive fluid 120 to be provided to the throttling device 300 before the motive fluid 120 fully traverses through the heat exchanger 200. For example, the heat exchanger 200 can have two outlets for the second flowpath 223 so that the motive fluid 120 that is provided to the throttling device 300 only traverses partially through the heat exchanger 200, whereas the motive fluid 120 that is provided to the discharge line 150 traverses completely through the heat exchanger 200. As just one example, the heat exchanger 200 can be a three-pass heat exchanger 200 and a valve 170 can be in fluid communication with the heat exchanger 200 at a location after the first pass. As such, a variable portion of the motive fluid 120 can exit the heat exchanger 200 after the first pass and be provided to the throttling device 300, whereas the remaining motive fluid 120 can fully traverse through all three passes before exiting the heat transfer system 100.

The throttling device 300 is in fluid communication with the coolant flowpath 130 at a location upstream of the heat exchanger 200 along the coolant flowpath 130 for providing the flow of motive fluid 120 to the coolant flowpath 130 at the location upstream of the heat exchanger 200. The throttling device 300 can be any device for providing the flow of motive fluid 120 through the coolant flowpath 130 for increasing a flow of the coolant fluid 110 through the coolant flowpath 130. For example, in certain exemplary embodiments, the throttling device 300 may be configured to allow the motive fluid 120 to experience the Joule-Thomson Effect when the flow of motive fluid 120 is provided to the coolant flowpath 130. In such a manner, the throttling device 300 may be configured to allow the motive fluid 120 to expand from a high pressure to a low pressure when the motive fluid is provided to the coolant flowpath 130, which causes the motive fluid 120 to be cooled and further induces airflow through the coolant flowpath 130.

In this example, the throttling device 300 includes one or more nozzles 310, the throttling device 300 being configured to eject the motive fluid 120 through the one or more nozzles 310 and into the coolant flowpath 130 at a pressure and a velocity that is greater than a pressure and velocity of the coolant fluid 110 that is flowing through the coolant flowpath 130. The high pressure motive fluid 120 can entrain the surrounding coolant fluid 110, thereby accelerating the flow of the coolant fluid 110 that is flowing through the coolant flowpath 130. In other words, the motive fluid 120 is injected into the coolant flowpath 130 at a location upstream from the heat exchanger 200 to increase the velocity of the coolant fluid 110 that is provided to the heat exchanger 200. This results in the velocity of the fluid in the coolant flowpath 130 to be greater downstream from the throttling device 300 than it is upstream from the throttling device 300.

The one or more nozzles 310 of the throttling device 300 can each include one or more openings 320. Each of the nozzles 310 can receive the high pressure motive fluid 120 and accelerate the motive fluid 120 through a conically-shaped, tapered portion to increase the velocity of the motive fluid 120 exiting the opening 320 of each of the nozzles 310. When the high pressure motive fluid 120 exits the openings 320, the motive fluid 120 is expanded.

The motive fluid 120 that exits the throttling device 300 is quickly expanded, which results in the motive fluid 120 being further cooled. For example, the pressure of the motive fluid 120 entering the throttling device 300 can be reduced by approximately 85 percent to 95 percent when it exits the throttling device 300, which can result in the temperature of the motive fluid 120 to be reduced by approximately 75 percent to 85 percent when it exits the throttling device 300 and is expanded. In one example, the pressure of the motive fluid 120 entering the throttling device 300 can be approximately 475 PSIA, whereas when it exits the throttling device 300 can expand to approximately 50 PSIA, which can correlate approximately to the pressure of the coolant fluid 110 upstream from the throttling device 300. This expansion from 475 PSIA to 50 PSIA can cause the temperature of the motive fluid 120 to be reduced from approximately 650° F. to about 130° F.

As such, injecting expanded motive fluid 120 into the coolant flowpath 130 results in the temperature of the coolant fluid 110 downstream from the throttling device 300, but upstream from the heat exchanger 210, to have a lower temperature than the coolant fluid 110 upstream from the throttling device 300. For example, the temperature of the coolant fluid 110 downstream from the throttling device 300 can be approximately five percent to 15 percent lower than the temperature of the coolant fluid 110 upstream from the throttling device 300. In one example, the temperature of the coolant fluid 110 upstream from the throttling device 300 is 300° F., whereas the temperature of the coolant fluid 110 downstream from the throttling device 300 is 270° F.

In at least one example, the throttling device 300 is configured as an ejector. However, in another example, the throttling device 300 is configured as an eductor. In another example, the throttling device 300 can include one or more nozzles 310 that can be variable-area nozzles 310 so that the amount of expansion of the motive fluid 120, along with the velocity, can be varied. In another example, the throttling device 300 can include one or more expansion valves in lieu of nozzles 310 to expand the motive fluid 120 that is provided to the coolant flowpath 130. In yet another example, the throttling device 300 can be an expansion turbine. The expansion turbine can include a turbine that is rotated by the expanding motive fluid 120; work can be extracted from the rotation of the turbine and can be used to drive a compressor. Even though the term "motive fluid" is a term commonly used with ejectors, it should not be implied that the throttling device 300 is always configured as an ejector. Instead, it will be appreciated that the term "motive" as used with the term "motive fluid" is a term of convenience and does not imply any specific configuration.

The coolant fluid 110 that is downstream from the throttling device 300, which includes the expanded motive fluid 120, enters the inlet 210 of the first flowpath 213 of the heat exchanger 200. As the coolant fluid 110 traverses the first flowpath 213 of the heat exchanger 200, it absorbs heat from the second flowpath 223 of the heat exchanger 200. The coolant fluid 110 then exits the outlet 215 of the first flowpath 213 of the heat exchanger 200 where it exits the heat transfer system 100.

In one example, the inlet 220 of the second flowpath 223 of the heat exchanger 200 receives motive fluid 120 at a temperature of approximately 1,000° F. and approximately 500 PSIA. The coolant fluid 110 upstream from the throttling device 300 can be at approximately 300° F. and 50 PSIA. If the heat exchanger 200 is approximately 50 percent effective with a five percent hot-side loss, this results in the motive fluid 120 exiting the outlet 225 of the second flowpath 223 of the heat exchanger 200 to be at approximately 650° F. and approximately 475 PSIA. Once the motive fluid 120 is expanded into the coolant flowpath 130 downstream from the throttling device 300, at approximately 50 PSIA, the temperature reduces to approximately 130° F. If the mixing ratio of coolant fluid 110 upstream from the throttling device 300 to expanded motive fluid 120 is approximately 5:1, this results in a temperature of the coolant fluid 110 entering the first flowpath 213 of the heat exchanger 200 to be approximately 270° F.

Figure 3:
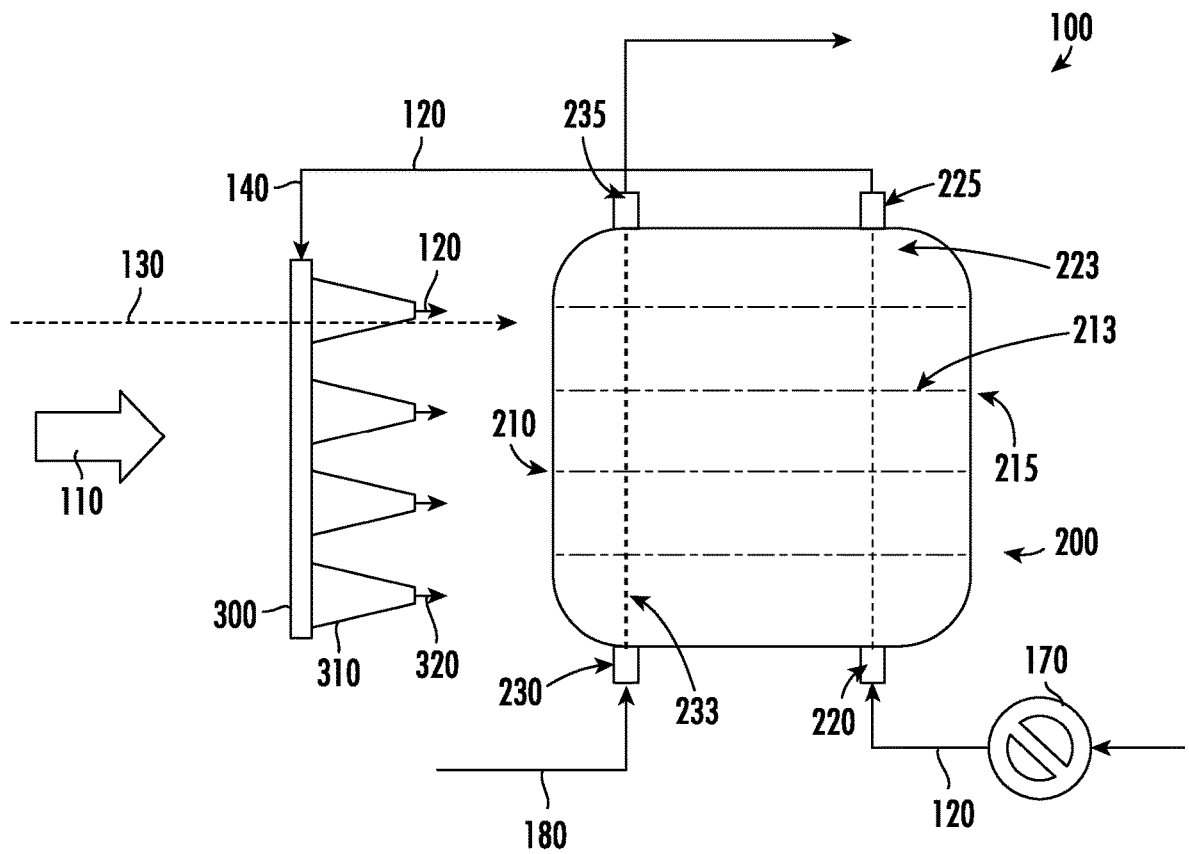
FIG. 3 is a schematic view of a heat transfer system in accordance with an exemplary embodiment of the present disclosure.

Referring now to FIG. 3, a schematic view of a heat transfer system 100 in accordance with another exemplary embodiment of the present disclosure is shown. The heat transfer system 100 of FIG. 3 may be configured in a similar manner as the exemplary heat transfer system 100 described above with reference to FIG. 2.

However, for the exemplary embodiment of FIG. 3, the heat exchanger 200 additionally defines at least in part a third flowpath 233 having an inlet 230 and an outlet 235. The third flowpath 233 can be configured to receive a flow of relatively hot fluid 180 to be cooled. The hot fluid 180 entering the inlet 230 can be at a higher temperature in relation to the coolant fluid entering the inlet 210. In one example, the hot fluid 180 is a lubricant flowing through a lubrication circuit, the lubricant being used to lubricate or cool moving components such as bearings or gears. Additionally, or alternatively, the hot fluid 180 may be a bleed airflow from a compressor section of the gas turbine engine, or any other fluid needing to be cooled. It will be appreciated that the term "hot" as used with the term "hot fluid" is a term of convenience and does not imply any specific temperatures for the hot fluid 180.

The heat exchanger 200 can function to cool the hot fluid 180 and the motive fluid 120 that passes through it with the coolant fluid 110 that is drawn from the coolant flowpath 130. This is accomplished by arranging the second flowpath 223 and the third flowpath 233 to both be in thermal communication with the first flowpath 213. For example, the first flowpath 213, second flowpath 223, and the third flowpath 233 are arranged so that heat is transferred from the second flowpath 223 and the third flowpath 233 to the first flowpath 213.

The first flowpath 213, the second flowpath 223, and the third flowpath 233 through the heat exchanger 200 are each fluidly independent from the other flowpaths. In other words, the first flowpath 213, the second flowpath 223, and the third flowpath 233 are not in fluid communication with another one of the first flowpath 213, the second flowpath 223, or the third flowpath 233. As such, the motive fluid 120, hot fluid 180, and the coolant fluid 110 do not fluidly mix while traversing through the heat exchanger 200.

The third flowpath 233 can be configured the same as, or different from, the second flowpath 223 of the heat exchanger 200. For example, the third flowpath 233 can be configured so that the hot fluid 180 can make one-pass through the heat exchanger 200 and the second flowpath 223 can be configured so that the motive fluid 120 can make one-pass through the heat exchanger 200. In contrast, the third flowpath 233 can be configured so that the hot fluid 180 can make three-passes through the heat exchanger 200 and the second flowpath 223 can be configured so that the motive fluid 120 can make one-pass through the heat exchanger 200. It should be appreciated that other configurations for the second and third flowpaths 223,233 are contemplated.

In this example, a valve 170, such as a two-way valve 170, is provided upstream from the inlet 220 of the second flowpath 223 of the heat exchanger 200 to adjust the amount of motive fluid 120 to be delivered to the throttling device 300. In another example, the valve 170 is provided downstream from the outlet 225 of the second flowpath 223. The valve 170 can open, either partially or fully, to allow a variable amount of the flow of the motive fluid 120 to be provided to the throttling device 300. For example, the valve 170 can allow none of the motive fluid 120 or all of the motive fluid 120 to be provided to the throttling device 300, and/or the valve 170 can allow a portion of the motive fluid 120 to be provided to the throttling device 300. In at least one example, the throttling device 300 allows 10 percent to 50 percent of the flow of the motive fluid 120 to be provided to the throttling device 300. The amount of the motive fluid 120 to be provided to the throttling device 300 can be varied during operation of the gas turbine engine and may be determined based on an engine parameter.

For example, the amount of motive fluid 120 to be provided to the throttling device 300 can be determined based on the desired temperature of the relatively hot fluid 180 to be output by the outlet 235 of the third flowpath 233 of the heat exchanger 200. When it is determined that the temperature of the relatively hot fluid 180 to be output by the outlet 235 of the third flowpath 233 of the heat exchanger 200 needs to be reduced, the valve 170 can open more to allow more of the motive fluid 120 to be provided to the throttling device 300. In at least one example, the amount of motive fluid 120 to be provided to the throttling device 300 can be determined based on the phase of operation of the aircraft that the engine is installed on. For example, when it is sensed that the aircraft is in a ground idle condition, the amount of motive fluid 120 to be provided to the throttling device 300 can be increased, such as from about zero percent, such as from about 10 percent, such as from about 20 percent, to about 30 percent, to about 40 percent, to about 50 percent of the motive fluid 120 can be provided to the throttling device 300. The phase of operation of the aircraft can be sensed based on vehicle speed and/or a weight-on-wheels sensor. For example, when vehicle speed is zero, it can be determined that the aircraft is in a ground idle condition. This determination method may be helpful when the engine includes a ram scoop duct. In another example, when the fan speed is below a threshold value, such as less than approximately 50 percent, such as between 40 percent and 60 percent, of maximum possible fan speed or less than 50 percent, such as between 40 percent and 60 percent, of designed fan speed, it can be determined that the aircraft is in a ground idle condition. This determination method may be helpful when the engine is configured as a turbofan engine.

Figure 4:
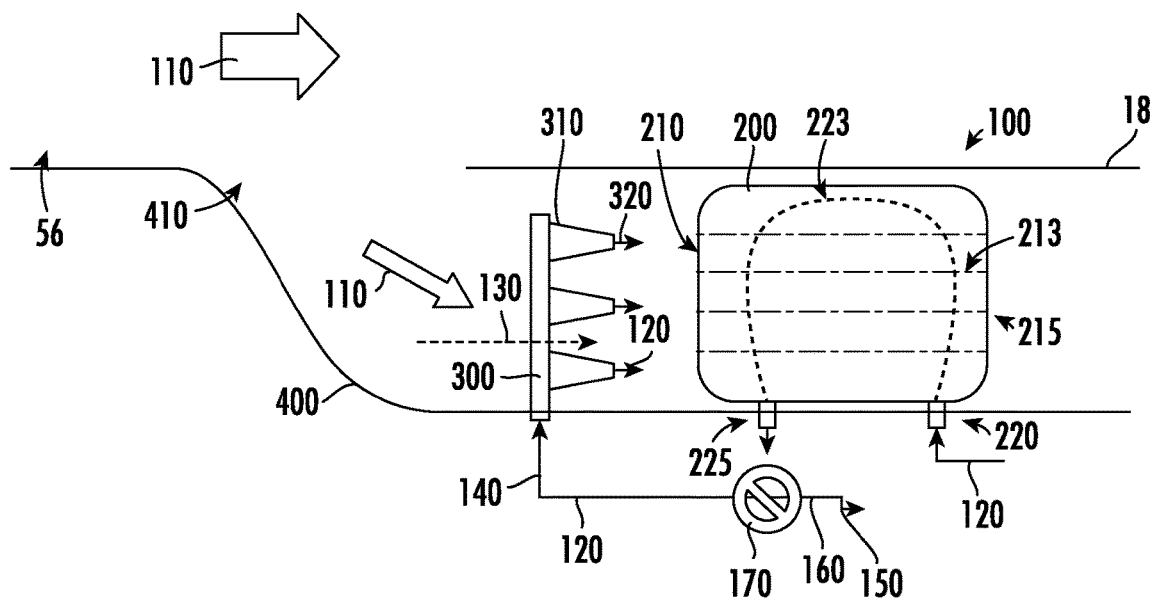
FIG. 4 is a schematic view of a heat transfer system in accordance with an exemplary embodiment of the present disclosure.

Referring now to FIG. 4, a schematic view of a heat transfer system 100 in accordance with yet another exemplary embodiment of the present disclosure is shown. The heat transfer system 100 of FIG. 4 can operate similarly to the heat transfer system 100 of FIG. 2 or FIG. 3. However, in this example, the heat transfer system 100 is located at least partially within a scoop 400 of a gas turbine engine. A scoop inlet 410 may be positioned in the fan section or a bypass flowpath, such as bypass airflow passage 56 that surround the outer casing 18 of turbofan engine 10, to bleed a coolant fluid 110 and direct it into the scoop 400 and toward the heat transfer system 100. As shown in this example, the heat exchanger 200 is configured as a two-pass heat exchanger so that the motive fluid 120 goes into one end of the heat exchanger 200 and is guided through a u-shaped pathway so that it exits on the same side of the heat exchanger 200 as it entered. However, it should be understood that other configurations for heat exchanger 200 are contemplated. For example, heat exchanger 200 could be a one-pass, three-pass, four-pass, etc. heat exchanger.

Like the example heat transfer systems 100 of FIGS. 2 and 3, the amount of the motive fluid 120 to be provided to the throttling device 300 can be varied during operation of the gas turbine engine and may be determined based on an engine parameter. For example, the engine parameter can be based on the desired temperature of the relatively hot fluid 180 to be output by the outlet 235 of the third flowpath 233 of the heat exchanger 200, based on the temperature difference between the motive fluid exiting outlet 225 of the heat exchanger 200 and the motive fluid exiting the throttling device 300, or based on the phase of operation of the aircraft that the engine is installed on, as already discussed. In some examples, the amount of motive fluid 120 to be provided to the throttling device 300 may be determined based on a combination of two or more engine parameters, such as the temperature difference between the motive fluid exiting the outlet 225 of the heat exchanger 200 and the motive fluid exiting the throttling device 300, and the phase of operation of the aircraft that the engine is installed on.

It should be understood that the embodiments disclosed in reference to FIGS. 1-4 are not intended to be limiting. Also, it should be understood that one or more embodiments described herein may be configured to incorporate other embodiments described herein. For example, the heat transfer system of FIG. 4 could incorporate a heat exchanger with a third flowpath as disclosed in reference to FIG. 3 or a one-pass heat exchanger as disclosed in reference to FIG. 2. As another example, the heat transfer system of FIGS. 2 and 4 can incorporate a valve that is upstream from the heat exchanger, as disclosed in reference to FIG. 3. As yet another example, the heat transfer system of FIGS. 3 and 4 can incorporate variable-area nozzles, as disclosed in reference to FIG. 1. Any suitable combination of embodiments provided are contemplated.

Incorporating the heat transfer system 100 as described in reference to FIGS. 2-4 may have many benefits. For example, the heat transfer system 100 provides for improved cooling of a fluid, such as a discharged motive fluid 160 or a relatively hot fluid 180, such as a lubricant. For example, cooling the motive fluid 120 through a heat exchanger 200 and expanding the motive fluid 120 into the coolant flowpath 130 may produce lower temperatures flowing into the heat exchanger 200 than using solely the coolant fluid 110. In other words, the cooled and expanded motive fluid 120 along with the coolant fluid 110 from the coolant flowpath 130 may result in lower temperatures of fluids entering the inlet 210 of the first flowpath 213 of the heat exchanger 200 than using solely the coolant fluid 110 from the coolant flowpath 130.

Additionally, or alternatively, cooling motive fluid 120 through a heat exchanger 200 and expanding the motive fluid 120 into the coolant flowpath 130 upstream from the heat exchanger 200 may produce lower temperatures flowing into the heat exchanger 200 than if motive fluid 120 was expanded into the coolant flowpath 130 upstream from the heat exchanger 200 without being initially cooled by the heat exchanger 200.

Additionally, or alternatively, the heat transfer system 100 allows for power density optimization by allowing the reduction of heat exchanger 200 volume and the modulation of cooling capacity in select engine operating conditions. This can be accomplished by, for example, instructing the valves 170 to reduce the amount of motive fluid 120 to be provided to the heat exchanger 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A heat transfer system comprising a heat exchanger located at least partially within a coolant flowpath, the heat exchanger defining at least in part a first flowpath and a second flowpath, the first flowpath configured to be in fluid communication with the coolant flowpath, and the second flowpath configured to receive a flow of a motive fluid; and a throttling device in fluid communication with the second flowpath of the heat exchanger for receiving at least a portion of the flow of the motive fluid from the heat exchanger, the throttling device further in fluid communication with the coolant flowpath at a location upstream of the heat exchanger for providing the flow of motive fluid to the coolant flowpath at the location upstream of the heat exchanger.

2. The heat transfer system of any preceding clause, further comprising a valve configured to adjust an amount of the flow of the motive fluid received by the throttling device from the heat exchanger.

3. The heat transfer system of any preceding clause, wherein the valve is a three-way valve that allows a first portion of the flow of the motive fluid to be received by the throttling device and a second portion of the flow of the motive fluid to be discharged from the heat transfer system as a cooling fluid flow.

4. The heat transfer system of any preceding clause, wherein the valve allows at least ten percent of the flow of the motive fluid to be received by the throttling device and the remaining amount of the motive fluid to be discharged from the heat transfer system as a cooling fluid flow.

5. The heat transfer system of any preceding clause, wherein the heat exchanger further defines at least in part a third flowpath that is configured to receive a flow of a hot fluid.

6. The heat transfer system of any preceding clause, wherein the throttling device is configured to provide the flow of motive fluid to the coolant flowpath at a pressure that is greater than a pressure of a coolant fluid through the coolant flowpath.

7. The heat transfer system of any preceding clause, wherein the second flowpath is configured to receive the flow of the motive fluid from a compressor section of a gas turbine engine.

8. The heat transfer system of any preceding clause, wherein the throttling device includes a conically-shaped nozzle having an opening, the opening being configured to provide the flow of motive fluid to the coolant flowpath at a velocity higher than a velocity of a coolant fluid in the coolant flowpath.

9. The heat transfer system of any preceding clause, wherein the throttling device includes a variable-area nozzle.

10. The heat transfer system of any preceding clause, wherein the throttling device is configured as an eductor.

11. A gas turbine engine comprising a turbomachine having a compressor section, a combustion section, and a turbine section; a cooling airflow passage; a heat transfer system positioned to receive a coolant fluid from the compressor section, the cooling airflow passage, or both, the heat transfer system comprising a heat exchanger located at least partially within a coolant flowpath, the heat exchanger defining at least in part a first flowpath and a second flowpath, the first flowpath configured to be in fluid communication with the coolant flowpath, and the second flowpath configured to receive a flow of a motive fluid; and a throttling device in fluid communication with the second flowpath of the heat exchanger for receiving at least a portion of the flow of the motive fluid from the heat exchanger, the throttling device further in fluid communication with the coolant flowpath at a location upstream of the heat exchanger for providing the flow of motive fluid to the coolant flowpath at the location upstream of the heat exchanger.

12. The gas turbine engine of any preceding clause, further comprising a valve configured to adjust an amount of the flow of the motive fluid received by the throttling device from the heat exchanger.

13. The gas turbine engine of any preceding clause, wherein the valve is a three-way valve that allows a first portion of the flow of the motive fluid to be received by the throttling device and a second portion of the flow of the motive fluid to be discharged from the heat transfer system as a cooling fluid flow.

14. The gas turbine engine of any preceding clause, wherein the valve allows at least ten percent of the flow of the motive fluid to be received by the throttling device and the remaining amount of the motive fluid to be discharged from the heat transfer system as a cooling fluid flow.

15. The gas turbine engine of any preceding clause, wherein the heat exchanger further defines at least in part a third flowpath that is configured to receive a flow of a hot fluid.

16. The gas turbine engine of any preceding clause, wherein the throttling device is configured to provide the flow of motive fluid to the coolant flowpath at a pressure that is greater than a pressure of a coolant fluid through the coolant flowpath.

17. The gas turbine engine of any preceding clause, wherein the second flowpath is configured to receive the flow of the motive fluid from a compressor section of a gas turbine engine.

18. The gas turbine engine of any preceding clause, wherein the throttling device includes a conically-shaped nozzle having an opening, the opening being configured to provide the flow of motive fluid to the coolant flowpath at a velocity higher than a velocity of a coolant fluid in the coolant flowpath.

19. The gas turbine engine of any preceding clause, wherein the throttling device includes a variable-area nozzle.

20. The gas turbine engine of any preceding clause, wherein the throttling device is configured as an eductor.

I claim:

1. A heat transfer system comprising:
   a heat exchanger located at least partially within a coolant flowpath, the heat exchanger defining at least in part a first flowpath and a second flowpath, the first flowpath configured to be in fluid communication with the coolant flowpath, and the second flowpath configured to receive a flow of a motive fluid; and
   a throttling device downstream from and in fluid communication with the second flowpath of the heat exchanger for receiving at least a portion of the flow of the motive fluid from the heat exchanger, the throttling device further in fluid communication with the coolant flowpath at a location upstream of the heat exchanger for providing the at least a portion of the flow of motive fluid to the coolant flowpath at the location upstream of the heat exchanger.

2. The heat transfer system of claim 1, further comprising a valve configured to adjust an amount of the flow of the motive fluid received by the throttling device from the heat exchanger.

3. The heat transfer system of claim 2, wherein the valve is a three-way valve that allows a first portion of the flow of the motive fluid to be received by the throttling device and a second portion of the flow of the motive fluid to be discharged from the heat transfer system as a cooling fluid flow.

4. The heat transfer system of claim 3, wherein the valve allows at least ten percent of the flow of the motive fluid to be received by the throttling device and the remaining amount of the motive fluid to be discharged from the heat transfer system as a cooling fluid flow.

5. The heat transfer system of claim 1, wherein the heat exchanger further defines at least in part a third flowpath that is configured to receive a flow of a hot fluid.

6. The heat transfer system of claim 1, wherein the throttling device is configured to provide the portion of the flow of motive fluid to the coolant flowpath at a pressure that is greater than a pressure of a coolant fluid through the coolant flowpath.

7. The heat transfer system of claim 1, wherein the second flowpath is configured to receive the flow of the motive fluid from a compressor section of a gas turbine engine.

8. The heat transfer system of claim 1, wherein the throttling device includes a conically-shaped nozzle having an opening, the opening being configured to provide the portion of the flow of motive fluid to the coolant flowpath at a velocity higher than a velocity of a coolant fluid in the coolant flowpath.

9. The heat transfer system of claim 1, wherein the throttling device includes a variable-area nozzle.

10. A heat transfer system comprising:
    a heat exchanger located at least partially within a coolant flowpath, the heat exchanger defining at least in part a first flowpath and a second flowpath, the first flowpath configured to be in fluid communication with the coolant flowpath, and the second flowpath configured to receive a flow of a motive fluid; and
    a throttling device downstream from and in fluid communication with the second flowpath of the heat exchanger for receiving at least a portion of the flow of the motive fluid from the heat exchanger, the throttling device further in fluid communication with the coolant flowpath at a location upstream of the heat exchanger for providing the portion of the flow of motive fluid to the coolant flowpath at the location upstream of the heat exchanger,
    wherein the throttling device is configured as an eductor.

11. A gas turbine engine comprising:
    a turbomachine having a compressor section, a combustion section, and a turbine section;

a cooling airflow passage;

a heat transfer system positioned to receive a coolant fluid from the compressor section, the cooling airflow passage, or both, the heat transfer system comprising:

a heat exchanger located at least partially within a coolant flowpath, the heat exchanger defining at least in part a first flowpath and a second flowpath, the first flowpath configured to be in fluid communication with the coolant flowpath, and the second flowpath configured to receive a flow of a motive fluid; and a throttling device downstream from and in fluid communication with the second flowpath of the heat exchanger for receiving at least a portion of the flow of the motive fluid from the heat exchanger, the throttling device further in fluid communication with the coolant flowpath at a location upstream of the heat exchanger for providing the portion of the flow of motive fluid to the coolant flowpath at the location upstream of the heat exchanger.

12. The gas turbine engine of claim 11, further comprising a valve configured to adjust an amount of the flow of the motive fluid received by the throttling device from the heat exchanger.

13. The gas turbine engine of claim 12, wherein the valve is a three-way valve that allows a first portion of the flow of the motive fluid to be received by the throttling device and a second portion of the flow of the motive fluid to be discharged from the heat transfer system as a cooling fluid flow.

14. The gas turbine engine of claim 13, wherein the valve allows at least ten percent of the flow of the motive fluid to be received by the throttling device and the remaining amount of the motive fluid to be discharged from the heat transfer system as a cooling fluid flow.

15. The gas turbine engine of claim 11, wherein the heat exchanger further defines at least in part a third flowpath that is configured to receive a flow of a hot fluid.

16. The gas turbine engine of claim 11, wherein the throttling device is configured to provide the portion of the flow of motive fluid to the coolant flowpath at a pressure that is greater than a pressure of the coolant fluid through the coolant flowpath.

17. The gas turbine engine of claim 11, wherein the second flowpath is configured to receive the flow of the motive fluid from the compressor section of the gas turbine engine.

18. The gas turbine engine of claim 11, wherein the throttling device includes a conically-shaped nozzle having an opening, the opening being configured to provide the portion of the flow of motive fluid to the coolant flowpath at a velocity higher than a velocity of the coolant fluid in the coolant flowpath.

19. The gas turbine engine of claim 11, wherein the throttling device includes a variable-area nozzle.

20. The gas turbine engine of claim 11, wherein the throttling device is configured as an eductor.

* * * * *